E. DE H. CALDWELL.
DIFFERENTIAL GEAR.
APPLICATION FILED JULY 14, 1917.
1,359,961.
Patented Nov. 23, 1920.
2 SHEETS—SHEET 1.
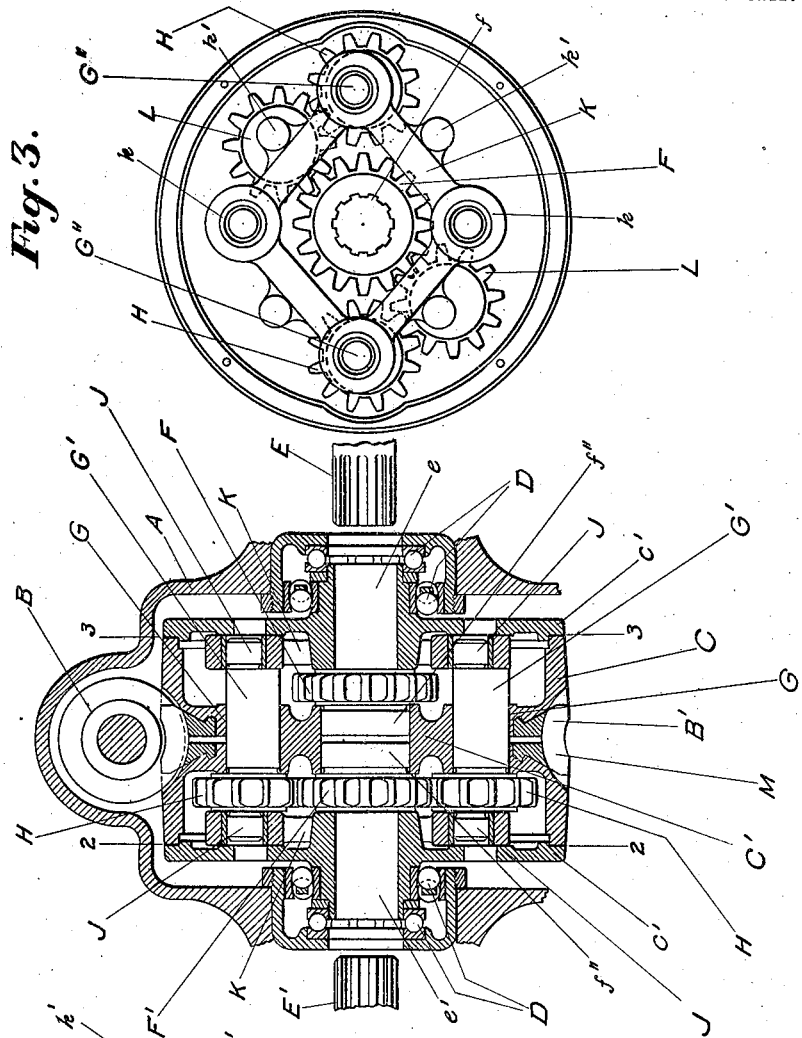
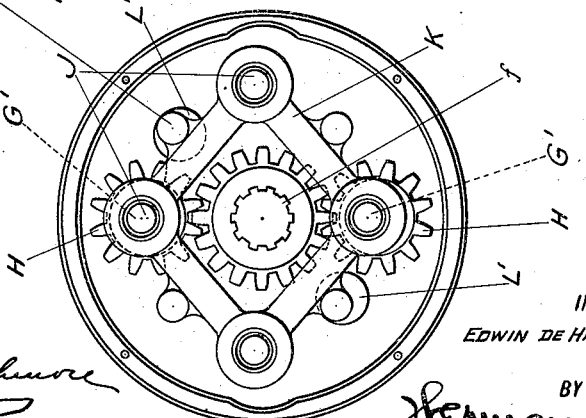
WITNESSES:
INVENTOR
EDWIN DE HAVEN CALDWELL
BY
his ATTORNEY E. DE H. CALDWELL.
DIFFERENTIAL GEAR.
APPLICATION FILED JULY 14, 1917.
1,359,961.
Patented Nov. 23, 1920.
2 SHEETS—SHEET 2.
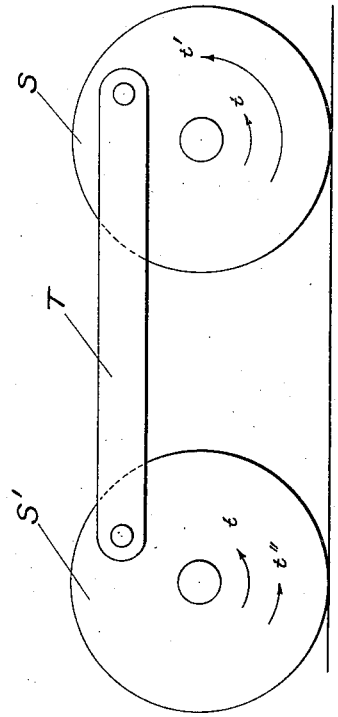
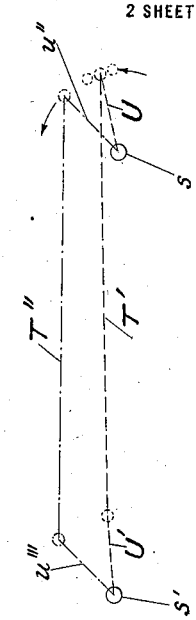
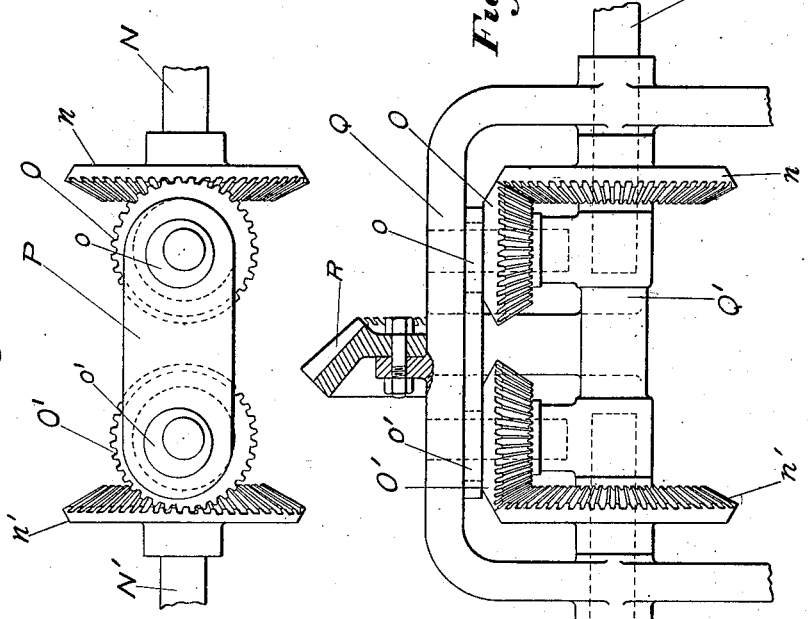
WITNESSES:
INVENTOR
EDWIN DE HAVEN CALDWELL
BY
his ATTORNEY

UNITED STATES PATENT OFFICE.

EDWIN DE HAVEN CALDWELL, OF DUNKIRK, NEW YORK, ASSIGNOR, BY MESNE ASSIGNMENTS, TO PERCY RIDINGS, TRUSTEE, OF SYRACUSE, NEW YORK.

DIFFERENTIAL GEAR.

1,359,961.  Specification of Letters Patent.  Patented Nov. 23, 1920.

Application filed July 14, 1917. Serial No. 180,523.

*To all whom it may concern:*

Be it known that I, EDWIN DE HAVEN CALDWELL, a citizen of the United States, residing in the town of Dunkirk and county of Chautauqua, State of New York, have invented certain new and useful Improvements in Differential Gears, of which the following is a specification, reference being had to the accompanying drawings, illustrative of one particular embodiment of my invention.

My invention relates to differential gears such as are used in the transmission of power to a two part shaft, as, for instance, in a motor car, to permit the desired differential speed of rotation of the two parts of the driving shaft and thereby accommodate the desired differential speed of rotation of the two driving road wheels. In particular, however, the object of my invention is to produce a differential gear for such purposes, that will afford means for properly accommodating any desired differential action, but which will prevent the objectionable relative motion of the driving axles or driven wheels which is likely to occur under unusual circumstances.

In general devices have been used which permit the tightening up of suitable bolts to lock an ordinary differential, and some devices have been constructed permitting the operator of a motor car to shift suitable bolts or other parts to lock the differential absolutely at times that he may forsee or realize difficulty in the transmission. As aptly illustrating peculiar conditions under which negativing the operation of the differential is desired, reference is frequently made to a car reaching a spot in the road when one wheel has good traction and the other reaches an ice surface or other very slippery road surface. Under such conditions the wheel on the ice has almost no traction and almost no resistance and starts to spin, that is revolve, at a high speed, the differential functioning in the usual manner and preventing the transmission of power to the other wheel that has traction.

My invention automatically causes the power transmitted to drive either wheel that has traction under such unusual conditions. It might best be termed an automatic controlled differential or an automatic differential control. The sudden absence of resistance on one side of the differential, or relatively speaking the sudden increase in resistance on the other, or relative magnitude of the turning effort or moment on either side of the differential automatically causes all the power of the engine to be transmitted to the wheel having the traction, and thereby move the vehicle until both driving wheels reach a road contact offering substantially equal resistance to traction, whereupon any desired slight differential action for normal and proper driving is again resumed automatically and the driving effort transmitted equally to the two driving wheels. Or, in other words, when the balance of resistance on each side of the differential is substantially or materially disturbed, then my differential construction will automatically cause the power to be transmitted to the wheel having good traction, thereby driving the vehicle past the bad spot and avoiding any waste of energy as the spinning of the wheel having no traction.

While differentials are usually made with straight gear pinions, or bevel gear pinions, I have embodied my invention more specifically in a straight gear construction, but it may be adapted to various forms of differentials or balance gears, and various modifications may be made. For purposes of illustration of the principle and to show a specific embodiment and detail of construction of one form, the accompanying drawings will be understood from the following description.

Figure 1 is a vertical transverse section of a particular form of my invention.

Fig. 2 is a side elevation of Fig. 1 of the differential case with the side plate removed, as in plane 2—2.

Fig. 3 is a side elevation on line 3—3 of Fig. 1, showing that side of the differential case with side plate removed.

Fig. 4 is an illustrative view, side elevation of the application of my invention to a bevel gear differential.

Fig. 5 is a plan view of Fig. 4, with the frame removed.

Fig. 6 is an illustrative view of certain parts of the device; Fig. 6ᴬ is a diagrammatic view for purposes of discussion of the illustrative view, Fig. 6.

As shown in Figs. 1, 2 and 3, A is a rear axle driving mechanism housing, B is a drive worm, B′ is a worm gear, C is the balance-gear casing or frame, C'—C' are the side plates of the balance-gear box, D—D are the bearings supporting the differential box in the housing A, E and E' are the inner ends of the two driving axle sections, removed from driving position.

When the driving axle sections are inserted into the openings e—e' of the differential box, their splined ends engage respectively, the gears F and F', passing through the hubs of said gears and being rotarily locked thereto by the splines f. The hubs of said gears f"—f" are supported in bearings in the web C' of the casing C; while at a greater distance from the axis of the box there are bearings G—G—G—G, two of which support shafts G'—G', and the other two support shafts G"—G". Each of these shafts has a gear H, two of which shafts and gears are assembled as shown in Fig. 1, and the other two located at a radius 90 degrees therefrom, are reversed end for end in their position and their axes are located farther away from the axis of the gear box, as shown at G"—G", Fig. 3.

Each of the shafts G'—G', G"—G" terminate at each end in an eccentric stud or shaft end J.

These eccentric studs on the differential pinion shafts are connected by a diamond-shape frame K, having bosses k, with bearings at its four corners, one axis of the frame being greater than the other axis to the extent of the greater distance between the axes of the shafts G"—G", as compared with shafts G'—G'. The two frames K—K on either side of the gear box thus constitute connecting links connecting all of the eccentric studs J, and for purposes of description, if we consider the frame K as shown in Fig. 3, it serves to transmit or to control by means of the eccentric studs J, the rotative movement between the shafts G' and G". The frame K as shown in Fig. 2, is in principle unnecessary, but placed on the other side of the gear box it balances the construction, serving to equalize strains and to still further insure proper functioning of the apparatus.

Gears L—L are mounted on bearings or hub shafts L', on the main differential frame C between the bearings G—G, and in a position whereby they mesh constantly with one of the gears H and the gear F as shown in the side illustrated in Fig. 3, thereby serving to reverse the motion between pinion H when transmitted to the driving shaft gear F. In turn the rotary movement of the two gears H shown in Fig. 3, is interconnected with the rotary movement of the gears H on the other side of the gear box by means of the eccentrics and links, and by means of said links and eccentrics the turning motion of the gears H must be in unison, whereby when rotating at all to accommodate a differential action of the axle driving shafts, they will permit an equal movement of gear F' in one direction, and a movement of gear F in the opposite direction, the reverse being obtained through the intermediate gears L—L.

With a substantially equal resistance on each driving shaft section E—E', or meaning a substantially equal resistance to motion on the part of the road wheels on opposite sides of the axle, the differential motion will be permitted and the link frame will control unison of motion between the differential pinions. If, however, there is a sudden or a substantial difference in the resistance offered at either of the drive wheel shafts, then the action of the eccentric link connections of the differential pinion shafts will prevent the differential from functioning, and consequently the driving effort of the worm B on its gear will be transmitted as if the entire differential were "locked" to that wheel having traction.

Or, in other words, when the balance of resistance on each side of the differential is substantially disturbed, then in order for the differential principle to function, one pinion would have to be driven in its rotation by the link and eccentric connections from the other pinion,—but with a small eccentricity, within predetermined limits, this driving effect by link and eccentric is opposed by a resistance depending upon the ratio of the parts and the resistance of the road wheel with the relation of eccentricity and the other dimensions, as shown in the embodiment of my invention, particularly in Figs. 1, 2 and 3, the resistance offered to driving by a link and such small eccentricity, is so proportioned that it is greater than the resistance offered to drive the vehicle through that wheel having the traction,—and consequently the power delivered from the engine will rotate that road wheel having traction before one pinion can drive the other, so that the power of the car finds its way through the entire driving system to the road wheel which will be effective to move the vehicle, until both wheels are again on good contact sufficient to offer a substantially equal resistance on both sides.

In this form of the construction the casing or frame C has cast therein the suitable alloy section M, which thereby becomes firmly secured and a part of the differential case and thus in its permanent position the worm gears are cut with every certainty of securing most accurate relation to the axis of the differential and with accuracy as to tooth form. On the frames K there are bosses k', two of which engage the face respectively, of gears L—L, thereby holding them in their proper plane, the bosses serving as a locating plate, while at the other side two of the bosses serve to locate the shaft of the gears. The other two bosses $k'$ on the other legs of the frames K, as shown in the drawings, are embodied simply for uniformity in manufacture to make a symmetrical part which may be assembled irrespective of side, and at the same time the structure is well balanced. This plate K might be of any form, but to accommodate the strains and to fit into the arrangement of the differential box the form of straight-sided diamond-shape lends itself most suitably.

In Figs. 4 and 5 there is illustrated the essential elements of a bevel pinion differential, for purposes of explanation, but without regard to exact dimensions such as the eccentricity or other features. Thus simply for illustrative purposes this bevel type of differential in these figures has two driving shafts N—N' which have gears $n$—$n'$ keyed or splined thereto, each engaging respectively bevel pinions O—O'. In the ordinary differential these bevel pinions O—O' would be one and the same instead of two, and would accommodate freely any relative movement in opposite directions of the axle gears $n$—$n'$. By separating the bevel pinion into two and making them two complete gears, I add a means of controlling the rotation of the two gears under unusual conditions. That is, by the plate P with a bearing at either end engaging the eccentric hub portions $o$—$o'$ of the gears O—O', like rotary movement is permitted of the gears O—O' in unison. If, however, the resistance to rotation on either one of the gears is materially greater, or if the relative resistance, as, for instance, a sudden rotary impulse on one is materially greater than on the other, the eccentric link connection between the bevel pinion hubs would have to drive the other bevel pinion. However, whether differential action will ensue depends whether there is sufficient power transmitted by the link from the one pinion to the other, and on account of the small eccentricity it would mean the power would have to be sufficient at the very small relative radius to overcome a large resistance. Before the force transmitted through the link is sufficient to cause this transmission of power, that force of the driving system of the car has exceeded the power necessary to turn the driving wheel still having traction, or, in other words, the power has been sufficient to propel the vehicle before it reaches the critical point of transmitting motion from one of the pinions to the other. Thus automatically in those unusual cases when differential action is not wanted, my differential box will not function,—but as soon as a substantial balance of resistance is restored as in straight running of the car with both wheels having traction, and for any degree of turning for which the differential is desired, the balance is such that the differential will function.

As shown in this illustrative form of embodiment of my invention in Figs. 4 and 5, bevel pinions O and O' are suitably mounted or supported on the frame Q and on any suitable interior frame connection Q', with a suitable main driving gear, as, for instance, main bevel gear R rigidly secured to said frame Q. In this manner the driving effort from the engine transmitted to the main gear R, rotates the frame Q about the axis of the driving shafts and with normal or substantially equal resistance on either road wheel, and therefore on either axle section, there will be an equal driving effort transmitted to the wheels, and any slight differential resistance on opposite wheels will be transmitted in proportion to the two bevel pinions O—O'. Such substantially equal reaction will cause their relative movement, which under such circumstances is accomplished without interference by the connecting link and eccentrics which in turn insure the rotation of gears O and O' in unison.

For purposes of illustration of a feature of my invention, I have shown in Fig. 6 two wheels S and S' connected by a link T and the arrow $t$—$t$ indicate substantially equal rotary effort applied to each of the two wheels and arrows $t'$—$t''$ diagrammatically illustrate relative substantial difference in the moment or resistance affecting the rotation of the wheels S and S', respectively. The eccentricity or crank length in this illustration is magnified and not intended to indicate any critical or comparable ratios.

As in Fig. 6$^A$, the centers of such wheels $s$—$s'$ are connected by the cranks U—U' and the link shown in center line T' and in another position T''. The cranks illustrate eccentricity of the link connections, but not as to exact ratio,—the eccentricity of the connecting links in the operative structure illustrated in Figs. 1, 2 and 3, and the position of such cranks when at $u''$—$u'''$ show a relative angularity at which motion is transmitted from one wheel S to the other wheel, when substantially equal impulses, as indicated diagrammatically by arrows $t$—$t$, or substantially equal resistance or reaction conditions exist.

When, however, as indicated by arrows $t'$—$t''$ the resistance or reaction is substantially out of balance, or have a marked discrepancy in magnitude, then in order for one to turn the other the power would have to be transmitted by the link T from one wheel, say, S, to the wheel S', and if the moment at the small radius $u'''$ is sufficient, then motion would take place in wheel or gear S'. If, however, the power of the driving mechanism is such that it will turn the road wheel having a good traction, before the force transmitted by the link T is sufficient to drive the gear S' from gear S, then the power will drive the vehicle through the one wheel having traction until a condition of substantial equality of resistance at the two road wheels again exists. As illustrated in diagram in Fig. 6ᴀ, the link in position T' would with small eccentricity as U—U', tend to a position of locking of dead-center, within a range as indicated by the dotted circles at the end of the crank U, and would strain the parts and create a condition which is avoided by having the links suitably arranged or interconnected, as, for instance, shown in Figs. 2 and 3.

The designing of differential embodying my invention may lead to various changes of combinations and dimensions, and for different conditions of service, power transmitted and other elements involved, may lead to different forms of design and many changes, without, however, departing from the spirit of my invention. Many additional advantages may be realized than herein specifically set forth, but with proper design, the very important functioning of a differential or balance gear is provided under the conditions when such is desired, and means of properly transmitting power and negativing the action of the differential results under the desired change of conditions.

Without confining myself to the specific embodiments herein shown and described, what I claim and desire to secure by Letters Patent is:

1. A differential gear for driven shafts, comprising differential pinions and means including an eccentric to automatically control the functioning of said differential pinions, dependent upon the balance of resistance on each side of said pinions.

2. A differential gear for driven shafts, comprising differential pinions and means including an eccentric to automatically negative the differential action, dependent upon balance of resistance on each side of said pinions.

3. A differential gear for driven shafts, comprising differential pinions and means including an eccentric to control the rotation of the pinions automatically dependent upon the ratio of driving resistance at the respective pinions.

4. In combination in a driven shaft, two axle members, gears on the adjacent ends of said two axles, pinions respectively engaging said gears and a link connecting said pinions to drive one from the other.

5. A spur-gear differential, comprising driven gears, a driving differential frame, shafts carried by said frame, pinions supported on said shafts, an eccentric on each pinion shaft and a link connecting the eccentrics of two of the pinions, whereby motion of said pinions on their axes is controlled by the eccentric and link connection.

6. A differential gear, comprising a driving frame, two pinion shafts supported thereby, a pinion on each shaft, two driven members each engaging respectively one of the pinions, a driving connection between said pinion shafts adapted to transmit rotation from one to the other, the actuation of which is dependent upon the relative resistance offered at each of said pinions with respect to the torque on said differential frame.

In testimony whereof, I have signed my name to this specification, in the presence of two subscribing witnesses, this 11th day of July, 1917.

EDWIN DE HAVEN CALDWELL.

Witnesses:
JAMES L. DROHEN,
GLENN W. WOODIN.